United States Patent
Sano et al.

(10) Patent No.: US 9,481,117 B2
(45) Date of Patent: Nov. 1, 2016

(54) MANUFACTURING METHOD OF DECORATIVE MOLDED ARTICLE AND DECORATIVE MOLDED ARTICLE

(71) Applicant: Teijin Limited, Osaka-shi, Osaka (JP)

(72) Inventors: Hiroki Sano, Matsuyama (JP); Takumi Kato, Matsuyama (JP)

(73) Assignee: Teijin Limited, Osaka-shi, Osaka (JP)

( * ) Notice: Subject to any disclaimer, the term of this patent is extended or adjusted under 35 U.S.C. 154(b) by 0 days.

(21) Appl. No.: 14/422,974

(22) PCT Filed: Aug. 12, 2014

(86) PCT No.: PCT/JP2014/071515
§ 371 (c)(1),
(2) Date: Feb. 20, 2015

(87) PCT Pub. No.: WO2015/023000
PCT Pub. Date: Feb. 19, 2015

(65) Prior Publication Data
US 2015/0202807 A1    Jul. 23, 2015

(30) Foreign Application Priority Data

Aug. 13, 2013 (JP) ................................. 2013-168255
Aug. 13, 2013 (JP) ................................. 2013-168256

(51) Int. Cl.
| | |
|---|---|
| B29C 43/20 | (2006.01) |
| B32B 3/30 | (2006.01) |
| C08J 5/04 | (2006.01) |
| B32B 27/08 | (2006.01) |
| B29C 43/52 | (2006.01) |
| B29C 43/18 | (2006.01) |
| B29K 101/00 | (2006.01) |
| B29K 307/04 | (2006.01) |

(52) U.S. Cl.
CPC ............... *B29C 43/20* (2013.01); *B29C 43/18* (2013.01); *B29C 43/52* (2013.01); *B32B 3/30* (2013.01); *B32B 27/08* (2013.01); *C08J 5/04* (2013.01); *C08J 5/042* (2013.01); *B29K 2101/00* (2013.01); *B29K 2307/04* (2013.01); *B32B 2250/02* (2013.01); *B32B 2250/24* (2013.01); *B32B 2262/10* (2013.01); *B32B 2305/08* (2013.01); *C08J 2300/22* (2013.01); *C08J 2300/24* (2013.01); *C08J 2400/22* (2013.01); *C08J 2400/24* (2013.01); *Y10T 428/24355* (2015.01); *Y10T 428/249952* (2015.04)

(58) Field of Classification Search
None
See application file for complete search history.

(56) References Cited

U.S. PATENT DOCUMENTS 8,900,502 B2    12/2014    Taniguchi et al.

FOREIGN PATENT DOCUMENTS

| | | | |
|---|---|---|---|
| CA | 2820131 A1 | * | 6/2012 |
| CA | 2821246 A1 | * | 6/2012 |
| EP | 0626901 A1 | | 12/1994 |
| EP | 2716433 A1 | | 4/2014 |
| EP | 2752442 A1 | | 7/2014 |
| EP | 2754685 A1 | | 7/2014 |
| JP | H05-24059 A | * | 2/1993 |
| JP | H05-024059 A | | 2/1993 |
| JP | 2001-323089 A | * | 11/2001 |
| JP | 2006-044264 A | | 2/2006 |
| JP | 2007-331369 A | * | 12/2007 |
| JP | 2008-265108 A | | 11/2008 |
| JP | 2009-226656 A | | 10/2009 |
| JP | 2011-102013 A | | 5/2011 |
| JP | 2011-189747 A | * | 9/2011 |
| JP | 2012-232506 A | | 11/2012 |
| WO | 2012165418 A1 | | 6/2012 |
| WO | WO 2012165418 A1 | * | 12/2012 |
| WO | 2013031860 A1 | | 3/2013 |
| WO | 2013035705 A1 | | 3/2013 |
| WO | WO 2013061682 A1 | * | 5/2013 |
| WO | WO 2013115337 A1 | * | 8/2013 |
| WO | WO 2013118689 A1 | * | 8/2013 |

OTHER PUBLICATIONS

Taniguchi et al., "Method for Manufacturing Compact with Sustated Isotropy" [WO 2012/165418 A1]; WIPO; Dec. 2012; (EPO machine translation [English]).*
Tatsuya, "Manufacture of Fiber-reinforced Thermoplastic Resin Decorative Molded Sheet" [JP H05-25059 A]; JP; Feb. 1993; (PAJ machine translation [English]).*
Ikuo, "Fiber-Reinforced Thermoplastic Resin Molded Product" [JP 2001-323089 A]; JP; Nov. 2001; (EPO machine translation [English]).*
Masato et al., "Method of Manufacturing Press Molded Article" [JP 2011-189747 A]; JP; Sep. 2011; (EPO machine translation [English]).*
Yasushi et al., "Fiber-Reinforced Plastic Molded Object and its Manufacturing Method" [JP 2007-331369 A]; JP; Dec. 2007; (EPO machine translation [English]).*
Feb. 17, 2015—(JP) Office Action—App 2014-560180—Eng Tran.
(Continued)

*Primary Examiner* — David Sample
*Assistant Examiner* — Donald M Flores, Jr.
(74) *Attorney, Agent, or Firm* — Banner & Witcoff, Ltd.

(57) ABSTRACT

In a manufacturing method of a decorative molded article, in which a surface of a fiber-reinforced resin shaped product including carbon fibers in which some carbon fibers are contained in a form of carbon fiber bundle and a thermoplastic resin, is decorated in the mold, a decorative molded article having excellent surface smoothness and an excellent appearance is provided by controlling a pressure in the mold during cooling.

13 Claims, No Drawings

(56) References Cited

OTHER PUBLICATIONS

Oct. 7, 2014—International Search Report—Intl App PCT/JP2014/071515.

Apr. 12, 2012—(WO) Written Opinion of ISA—Intl App PCT/JP2014/071515.
Jul. 4, 2016—(EP) Supplementary Search Report—App 14835899.
Jul. 25, 2016—(EP) Communication—App 14835899.7.

* cited by examiner

MANUFACTURING METHOD OF DECORATIVE MOLDED ARTICLE AND DECORATIVE MOLDED ARTICLE

CROSS REFERENCE TO RELATED APPLICATIONS

This is a U.S. National Phase Application under 35 U.S.C. §371 of International Application No. PCT/JP2014/071515, filed Aug. 12, 2014, which claims priority to Japanese Patent Application No. 2013-168255, filed Aug. 13, 2013, and Japanese Patent Application No. 2013-168256, filed on Aug. 13, 2013 the entire disclosures of which are incorporated herein by reference.

TECHNICAL FIELD

The present invention relates to a manufacturing method of a decorative molded article. More specifically, the present invention relates to a manufacturing method of a decorative molded article having a layer on a surface of a fiber-reinforced resin shaped product including carbon fibers and a thermoplastic resin, and the decorative molded article.

BACKGROUND ART

In recent years, in a mechanical field, a fiber-reinforced resin shaped product including a thermoplastic resin as a matrix and reinforcing fibers such as carbon fibers has attracted attention. In the fiber-reinforced resin shaped product, reinforcing fibers are dispersed in the shaped product. Accordingly, in many cases, patterns of the reinforcing fibers appear on the surface of the shaped product. The patterns may be used as a design on the surface of the shaped product as it is. However, according to the use, an excellent appearance such as concealed patterns of the reinforcing fibers is required.

By the way, in general, in the fiber-reinforced resin shaped product, since reinforcing fibers are protruded from the surface, the surface thereof is not smooth in many cases. When decoration such as coating is performed on the surface, irregularity on the surface of the fiber-reinforced resin shaped product before the decoration appears on the decorated surface as it is, and thus, there is a problem that a smooth surface is difficult to be obtained. Patent Documents 1 and 2 describe an in-mold coating method in which paint is injected to a surface of a fiber-reinforced resin shaped product in a mold and is hardened to increase smoothness of the surface of the shaped product.

The inventors understand that the irregularity is generated on the surface of the fiber-reinforced resin shaped product and the patterns of reinforcing fibers remarkably appear on the surface when the content of the reinforcing fibers is increased or the reinforcing fibers form a fiber bundle. In addition, the inventors understand that it is also difficult to obtain the decorative molded article having excellent smoothness and appearance even by the method described in Patent Document 1. Particularly, when the reinforcing fibers are contained in the fiber-reinforced resin shaped product as a fiber bundle, it is difficult to obtain the decorative molded article having excellent smoothness and appearance of the surface.

CITATION LIST

Patent Document

[Patent Document 1] JP-A-2012-232506
[Patent Document 2] JP-A-05-24059

SUMMARY OF INVENTION

Problems that the Invention is to Solve

An object of the present invention is to provide a new manufacturing method of a decorative molded article containing carbon fibers in a form of a bundle.

Another object of the present invention is to provide a manufacturing method of a decorative molded article in which the surface of the decorative molded article containing carbon fibers in a form of a bundle has excellent smoothness and excellent appearance in a manufacturing method of the decorative molded article in which the surface of the fiber-reinforced resin shaped product containing carbon fibers and a thermoplastic resin is decorated.

Further another object of the present invention is to provide a new decorative molded article containing carbon fibers in a form of a bundle and having excellent surface properties and appearance.

Means for Solving the Problems

As a result of intensive studies to solve the above-described problems, the inventors find that it is extremely effective to control a pressure in a mold during cooling when a fiber-reinforced resin shaped product is decoratively molded in the mold, and completed the present invention.

According to the present invention, the following manufacturing method is provided.

1. A manufacturing method of a decorative molded article having a layer which includes a thermosetting resin or a thermoplastic resin (P2) on a surface of a fiber-reinforced resin shaped product including carbon fibers and a thermoplastic resin (P1), including:

(i) using a shaped product in which at least some carbon fibers are contained in a form of fiber bundle as the fiber-reinforced resin shaped product, and placing the fiber-reinforced resin shaped product containing the fiber bundle in a mold heated;

(ii) introducing the thermosetting resin or the thermoplastic resin (P2) into the mold;

(iii) molding the thermosetting resin or the thermoplastic resin (P2) in the mold by pressurization; and (iv) cooling the inside of a mold, while maintaining the inside of the mold to a pressure within a range from 2 MPa to 50 MPa:

to a temperature range from 10° C. to a glass transition point when the thermoplastic resin (P1) is an amorphous resin and the glass transition point is 10° C. or more;

to a temperature range from 10° C. to a crystallization temperature when the thermoplastic resin (P1) is a crystalline resin and the crystallization temperature is 10° C. or more; or to a temperature range from 10° C. to 80° C. when the thermoplastic resin (P1) is an amorphous resin and the glass transition point is less than 10° C. or the thermoplastic resin (P1) is an crystalline resin and the crystallization temperature is less than 10° C.

In addition, the following contents are included in the present invention.

2. The manufacturing method of a decorative molded article described in 1, further including, before the step (i), (i') placing a precursor of the fiber-reinforced resin shaped product, containing at least some carbon fibers are contained in a form of fiber bundle in a heated mold and molding the precursor by heating and pressurization to manufacture the fiber-reinforced resin shaped product.

3. The manufacturing method of a decorative molded article described in 1 or 2, wherein the inside of the mold is maintained to a constant pressure within a range from 2 MPa to 50 MPa in the step (iv).

4. The manufacturing method of a decorative molded article described in any one of 1 to 3, wherein the pressurization is performed within a range from 2 MPa to 50 MPa in the step (iii).

5. The manufacturing method of a decorative molded article described in any one of 1 to 4, wherein the carbon fibers are discontinuous.

6. The manufacturing method of a decorative molded article described in any one of 1 to 5, wherein an average thickness of the fiber bundle is within a range from 10 μm to 300 μm.

7. The manufacturing method of a decorative molded article described in any one of 1 to 6, wherein a weight-average fiber width of the fiber bundle is within a range from 0.03 mm to 4 mm.

8. The manufacturing method of a decorative molded article described in any one of 1 to 7, wherein a ratio of the carbon fibers being contained in the form of fiber bundle is 20% to 99% by weight with respect to the total amount of the carbon fibers.

9. The manufacturing method of a decorative molded article described in any one of 1 to 8, wherein the thermoplastic resin (P1) is the same kind as the thermoplastic resin (P2) in the step (ii).

10. The manufacturing method of a decorative molded article described in any one of 1 to 9, wherein the thermoplastic resin (P1) is a crystalline resin.

11. A decorative molded article obtained by using the manufacturing method of a decorative molded article described in any one of 1 to 10.

12. A decorative molded article including a layer which includes a thermosetting resin or a thermoplastic resin (P2) on a surface of a fiber-reinforced resin shaped product including carbon fibers and a thermoplastic resin (P1), wherein at least some carbon fibers are contained in a form of fiber bundle in the fiber-reinforced resin shaped product.

13. The decorative molded article described in 12, wherein the carbon fibers are discontinuous.

14. The decorative molded article described in 12 or 13, wherein an average thickness of the fiber bundle is within a range from 10 μm to 300 μm, and a weight-average fiber width of the fiber bundle is within a range from 0.03 mm to 4 mm.

15. The decorative molded article described in any one of 12 to 14, wherein a ratio of the carbon fibers being contained in the form of fiber bundle is 20% to 99% by volume with respect to the total amount of the carbon fibers.

16. The decorative molded article described in any one of 12 to 15, wherein irregularity on a surface of the layer is generally within a range from 1 μm to 5 μm by Ra.

Advantageous Effects of Invention

According to the present invention, when a layer is formed on a surface of a fiber-reinforced resin shaped product containing carbon fibers in a form of a bundle, by cooling the inside of a mold after pressurization and heating while maintaining the mold at a specific pressure range, the shapes of the carbon fibers are difficult to appear on the surface of an obtained decorative molded article and generation of patterns of the carbon fibers is decreased. Accordingly, it is possible to obtain a decorative molded article being beautiful and having an excellent surface appearance. Moreover, in the decorative molded article, the surface is extremely flat, and smoothness is excellent. Particularly, since the fiber-reinforced resin shaped product contains carbon fiber bundles, it is possible to extremely effectively prevent patterns and shapes of irregularities of the carbon fibers which are liable to be generated on the surface of the decorative molded article. In addition, the layer which covers the surface of the decorative molded article strongly comes into close contact with the carbon fiber resin shaped product, and thus, durability also is excellent.

DESCRIPTION OF EMBODIMENTS

Hereinafter, the present invention will be described in detail.

In the present invention, there is provided a manufacturing method of a decorative molded article, wherein a layer is formed on a surface of a fiber-reinforced resin shaped product including carbon fibers and a thermoplastic resin (P1) by using a thermosetting resin or a thermoplastic resin (P2) as a decorative material to perform a decorative molding, and the following steps (i) to (iv) are performed in this order. The steps include: (i) using a shaped product in which at least some carbon fibers are contained in a form of fiber bundle as the fiber-reinforced resin shaped product, and placing the fiber-reinforced resin shaped product containing a fiber bundle in a heated mold; (ii) introducing the thermosetting resin or the thermoplastic resin (P2) into the mold; (iii) molding the thermosetting resin or the thermoplastic resin (P2) in the mold by pressurization; and (iv) cooling the inside of the mold: to a temperature range from 10° C. to a glass transition point when the thermoplastic resin (P1) is an amorphous resin and the glass transition point temperature thereof is 10° C. or more; to a temperature range from 10° C. to a crystallization temperature when the thermoplastic resin (P1) is a crystalline resin and the crystallization temperature thereof is 10° C. or more; or to a temperature range from 10° C. to 80° C. when the thermoplastic resin (P1) is an amorphous resin and the glass transition point thereof is less than 10° C. or the thermoplastic resin (P1) is an crystalline resin and the crystallization temperature thereof is less than 10° C., while maintaining the inside of the mold to a pressure within a range from 2 MPa to 50 MPa.

In the present invention, preferably, the following step (i') is performed before the step (i) is performed. The step (i') is a step of placing a precursor of the fiber-reinforced resin shaped product containing at least some carbon fibers in a form of fiber bundle in the heated mold and molding the precursor by pressurization to manufacture the fiber-reinforced resin shaped product.

Since it is possible to perform the step (i') in a mold in which the precursor of the fiber-reinforced resin shaped product is manufactured and to continuously perform the step (i) in the same mold, there is an advantage that productivity is improved.

In the present invention, as a decorative material, the thermosetting resin or the thermoplastic resin (P2) is used as a single body or a material including the thermosetting resin or the thermoplastic resin (P2).

When the thermosetting resin is used as a decorative material, the decorative material is generally injected into a gap between the fiber-reinforced resin shaped product and the mold, the mold is heated in a state where the mold is closed, and thus, it is possible to harden the decorative material and to perform transfer of the mold to the decorative material. In addition, by cooling the mold under a specific condition in the state where the decorative material is hardened and the mold is closed, it is possible to manufacture the decorative molded article in which a layer made from the thermosetting resin is formed on the surface of the fiber-reinforced resin shaped product. Specific compounds of the thermosetting resin will be described below.

Also, when the thermoplastic resin (P2) is used as a decorative material, a thermoplastic resin which is softened or liquefied by preferably heating is introduced into a gap between the fiber-reinforced resin shaped product and the mold, or a shaped product such as a fiber, a nonwoven fabric, a film, or a sheet, made from the thermoplastic resin is introduced, and then the shaped product is deformed by the heat of the mold. The former inputting method is preferred in terms of excellent workability and productivity. In this way, it is possible to perform adhesion of the thermoplastic resin and the transfer of the mold on the surface of the fiber-reinforced resin shaped product. Thereafter, it is possible to achieve the manufacturing method of the decorative molded article of the present invention by cooling the mold under a specific pressure condition while closing the mold. The thermoplastic resin (P2) is solidified in the step of the cooling, and is formed on the surface of the molded article as a layer. Here, the thermoplastic resin (P2) to be used as a decorative material may be decorative materials exemplified by the thermoplastic resin constituting the fiber-reinforced resin shaped product, described below. When the thermoplastic resin (P2) for the decoration is the same kind as the thermoplastic resin constituting the fiber-reinforced resin shaped product, adhesion between the thermoplastic resin (P2) and the surface of the fiber-reinforced resin shaped product becomes better and such a thermoplastic resin is preferable.

In the present invention, a mold is generally used as a form in order to manufacture the fiber-reinforced resin shaped product. It is preferable that the mold (movable type) to be used when manufacturing the fiber-reinforced resin shaped product is different from the mold (movable type) to be used for decorative molding. Since the fiber-reinforced resin shaped product contains carbon fibers, the fiber-reinforced resin shaped product has high hardness. Accordingly, there is a concern that the fiber-reinforced resin shaped product may damage the mold. When the decoration is continuously performed in the state where the mold is damaged, scratches of the mold are transferred to the decorated surface (the layer generated by the decoration) as those are, and thus, irregularities may be formed on the surface of the obtained decorative molded article. By using the different molds, the transfer of the scratches on the surface of the mold to the surface of the decorative molded article may be prevented, and thus, it is possible to obtain more flatten surface of the decorative molded article.

Hereinafter, a preferable manufacturing method of the decorative molded article in the present invention will be described.

<Fiber-Reinforced Resin Shaped Product>

The fiber-reinforced resin shaped product (referred to as a molding material in some cases) according to the present invention includes carbon fibers and a thermoplastic resin (P1) which is a matrix.

(Carbon Fiber)

Since carbon fibers to be used in the present invention have lighter weight and more excellent strength compared to general reinforcing fibers other than the carbon fibers, the carbon fibers can be suitably used in a shaped product for, particularly, an automobile. As the carbon fibers, PAN based carbon fibers or pitch-based carbon fibers may be exemplified. In the present invention, within a range (for example, 10% by volume or less of the total carbon fibers) in which reinforcing effects of the carbon fibers are not impaired, for example, inorganic fibers such as glass fibers and silicon carbide fibers, organic fibers such as aramid fibers, metallic fibers, or the like may be used together with the carbon fibers.

In the carbon fibers, at least a portion where some carbon fibers are contained in the fiber-reinforced resin shaped product in a form of a fiber bundle. Specifically, in the carbon fibers, the form of fiber bundle and the form of a single fiber are mixed in the fiber-reinforced resin shaped product. In the present invention, the fiber bundle means that two or more of single fibers are bundled. A preferable content of the fiber bundle is within a range from 5% by volume to 99% by volume per 100% by volume of the carbon fibers, and the preferable content of the single fiber is within a range from 95% by volume to 1% by volume. Since the fiber bundle is contained within the range, the fiber-reinforced resin shaped product and the obtained decorative molded article have excellent moldability and mechanical strength. In addition, surprisingly, though a relatively large amount of the carbon fiber bundles is contained, the irregularities on the surface of the decorative molded article obtained in the present invention are extremely decreased and the surface is flat, and thus, it is possible to decrease the patterns of the carbon fibers including the fiber bundles. In this way, the decorative molded article containing the fiber bundles has not only the excellent moldability and mechanical strength but also excellent surface properties, and thus, the balance among these is excellent. A more preferable content of the fiber bundles is within a range from 20% by volume to 99% by volume per 100% by volume of the carbon fibers, and the content of the single fiber is preferably within a range from 1% by volume to 80% by volume. The lower limit in the more preferable content of the fiber bundles is 50% by volume, and the lower limit in the still more preferable of the fiber bundles is 60% by volume. The content of the fiber bundles is also maintained in the decorative molded article.

An average of thickness of the fiber bundles is preferably within a range from 10 μm to 300 μm. Since the thermoplastic resin is easily impregnated into the fiber bundles by meeting the range, dry fiber bundles do not substantially exist. Accordingly, roughness of the surface of the obtained decorative molded article tends to be decreased. The thickness of the fiber bundle is more preferably 10 μm to 200 μm. This thickness is also maintained in the decorative molded article.

Moreover, an average of weight-average fiber width (Ww) of the fiber bundles is preferably within a range from 0.03 mm to 4 mm. The average fiber width approximately represents the number of fibers in the fiber bundles. By meeting the range, it is possible to obtain the decorative molded article which is well-balanced in the moldability and the mechanical strength. The weight-average fiber width (Ww) is also maintained in the decorative molded article.

Meanwhile, the weight-average fiber width (Ww) of the carbon fiber bundles can be obtained from the following Expression by using the width (hereinafter, referred to as a fiber width or Wi in some cases), the weight (hereinafter, referred to as a fiber weight or wi in some cases), and the total weight (w) of the extracted carbon fibers with respect to each of the sufficient number of carbon fibers extracted from a structure substantially configured by remaining carbon fibers obtained by heating the fiber-reinforced resin shaped product or the decorative molded article at 500° C. to remove the resin.

$$Ww=\Sigma(Wi \times wi/w)$$

In the Expression, i is a natural number which is from 1 to the number of carbon fibers extracted from the structure.

The form of the carbon fiber in the present invention is not particularly limited, and may be a continuous fiber, a discontinuous fiber, or both.

In the case of continuous fiber, the form of the carbon fiber may be a texture, or a so-called UD sheet in which continuous fibers are arranged in one direction and are formed in a sheet shape. When the UD sheet is used, the plurality of sheets may be stacked. When the sheets are stacked, UD sheets in which that the arrangement directions of the fibers of each UD sheet intersect with one another (for example, the sheets are stacked so that the fiber directions of the UD sheet are alternately orthogonal to one another) may be used. In general, a suitable average fiber diameter of the continuous fibers is 5 μm to 20 μm.

When discontinuous carbon fibers are used, for example, the form of the carbon fiber may be a sheet shape obtained by wet forming or may be a mat shape in which the discontinuous carbon fibers are distributed and arranged to overlap with one another. The average fiber diameter is preferably within a range from 5 μm to 20 μm. An average fiber length of the discontinuous carbon fibers is 3 mm or more, is preferably within a range from 10 mm to 100 mm, and more preferably a range from 12 mm to 50 mm. In the mat shape which is the latter, the average fiber length of the carbon fibers included in the mat is important. In the case where the average fiber length is shorter than 3 mm, the role as carbon fiber is not sufficiently accomplished, and the fiber-reinforced resin shaped product may not obtain sufficient mechanical strength. On the other hand, in the case where the average fiber length is longer than 100 mm, for example, when the manufacturing is performed by press molding, flowability during the molding is low, and thus, a desired shaped product may not be obtained.

(Precursor of Fiber-Reinforced Resin Shaped Product and Random Mat)

In the present invention, a fiber-reinforced resin shaped product is preferably manufactured by placing a precursor of the fiber-reinforced resin shaped product (hereinafter, simply referred to as a precursor in some cases), containing continuous fibers, discontinuous fibers, and mixed fibers thereof in which at least a portion of carbon fibers is contained in the form of fiber bundle, in a heated mold and by molding the precursor under pressurization. Here, the precursor is not particularly limited. However, a material including discontinuous carbon fibers is preferable. The precursor may contain the thermoplastic resin (P1). As the form of the precursor, the shaped product in the above-described sheet shape, mat shape, or a plate shape having a certain thickness is preferable.

The precursor is preferably manufactured by using a mat (hereinafter, referred to as a random mat in some cases) in which discontinuous carbon fibers are substantially two-dimensionally randomly oriented. Here, "substantially two-dimensional random orientation" means a state where the carbon fibers are not aligned in a specific direction like one direction and are disorderly oriented in in-plane directions of the mat so that the carbon fibers are arranged in the plane without developing specific directivity as a whole. Accordingly, the random mat, the precursor, and the fiber-reinforced resin shaped product in the present invention do not have anisotropy in the in-plane directions and substantially have isotropy in the in-plane (the two-dimensional) directions.

Preferably, the random mat contains the thermoplastic resin (P1), and the carbon fibers have fiber bundles in which two or more single fibers are bundled. More preferably, the fiber bundle in which two or more single fibers are bundled and a single fiber or a fiber bundle close to a single fiber state are mixed by a specific ratio. This is because when the fiber-reinforced resin shaped product is obtained by using the random mat and the decorative molded article which is the final product is manufactured, the form and the content of the fiber bundle are substantially maintained. Here, in the ratios of the carbon fibers existing in the form of fiber bundle and the carbon fibers existing in the state of the single fiber, as described above, the fiber bundle is preferably within the range from 20% by volume to 99% by volume, and the single fiber is preferably within the range from 1% by volume to 80% by volume. By containing both of the carbon fibers in the form of fiber bundle and the carbon fibers in the form of single fiber at the ranges, when the random mat is placed in the mold and the precursor or the fiber-reinforced resin shaped product are manufactured, flowability of the fiber bundle and the single fiber in the mold is excellent, and thus, the formability and moldability are excellent. It is also preferable that a content (Vf) of the carbon fibers in the precursor or the fiber-reinforced resin shaped product tends to be increased.

As a method of adjusting a desired ratio of the carbon fibers being contained in the form of fiber bundle and the carbon fibers being contained in the state of the single fiber, there is a method in which an opening degree of the fiber bundled is controlled by operating a fluid such as air or water.

As described above, the average of the thicknesses of the fiber bundles being contained in the fiber-reinforced resin shaped product in the present invention is preferably within the range from 10 μm to 300 μm. In order to meet the range, when the random mat is manufactured, for example, there may be a method in which the opening degree of fibers is controlled by operating the fluid such as air or water.

In addition, as described above, the average of the weight-average fiber widths (Ww) of the fiber bundles is preferably within the range from 0.03 mm to 4 mm. In order to meet the range, when the random mat is manufactured, for example, there may be a method in which a slit width is controlled.

The above-described random mat is a random mat having excellent isotropy and including a carbon fiber bundle (A) constituted by fibers of a critical number of single fiber or more, the critical number defined by the following Expression (a), and at least one of carbon fiber bundle (B1) constituted by fibers of less than the critical number of single fiber and a carbon single fiber (B2), in which a ratio of the carbon fiber bundle (A) with respect to the total amount of fibers in the isotropic random mat is 20% by volume to 99% by volume (Vol %), preferably 30 Vol % to 90 Vol %, and the average number of fibers (N) in the carbon fiber bundle (A) satisfies the following Expression (b).

$$\text{Critical number of single fiber} = 600/D \quad \text{(a)}$$

$$0.6 \times 10^4/D^2 < N < 1 \times 10^5/D^2 \quad \text{(b)}$$

(Here, D is the average fiber diameter (μm) of carbon single fibers)

When the average number of fibers (N) in the carbon fiber bundle (A) is equal to or less than $0.6 \times 10^4/D^2$, it is difficult to obtain the decorative molded article having a high volume content (Vf) in the carbon fibers, and thus, excellent strength is difficult to be achieved. In addition, when the average number of fibers (N) in the carbon fiber bundle (A) is equal to or more than $1 \times 10^5/D^2$, a thick portion is locally generated in a portion of the fiber-reinforced resin shaped product when molding by pressurization, and thus, such a values is liable to be a factor that voids are generated in the inner portion of the fiber-reinforced resin shaped product.

In the isotropic random mat, the isotropic random mat and a manufacturing method thereof are described in detail in Pamphlet of International Publication No. 2012/105080 and JP-A-2013-49208.

For example, in the present invention, it is possible to manufacture the isotropic mat in accordance with the following method. It can be obtained by: continuously slitting a strand constituted by a plurality of carbon fibers along the fiber length direction if necessary to obtain a plurality of thin strands having a width of 0.05 mm to 5 mm; thereafter cutting the strands to have the average fiber length of 3 mm to 100 mm; opening the cut carbon fiber bundles by spraying air; and depositing, in such a state, the opened carbon fiber bundles and in on an air permeable conveyor net in a stacked state. At this time, by depositing a granular or short fiber shaped thermoplastic resin (P1) on the air permeable conveyor net together with the carbon fibers or supplying a molten thermoplastic resin (P1) to the carbon fibers, which is deposited in a mat shape, in a film shape to be impregnated into the carbon fibers, it is possible to manufacture the isotropic random mat containing the thermoplastic resin (P1). Here, the thermoplastic resin (P1) constitutes a matrix which is contained in the fiber-reinforced resin shaped product of the present invention.

The isotropic random mat may contain, by adjusting an opening condition such as a wind speed generated by spraying air, the carbon fiber bundle (A) in which the carbon fibers are bundled so as to have the critical number of single fiber or more, the critical number defined by the Expression (a), and the carbon fiber bundle (B1) including carbon fibers of less than the critical number of single fiber or the carbon single fiber (B2), or both thereof. Here, in the random mat, the ratio of the carbon fiber bundle (A) with respect to the total amount of the carbon fibers is 20 Vol % to 99 Vol %, preferably 30 Vol % to 90 Vol %, and more preferably 50 Vol % to 90 Vol %. Also, the average number of fibers (N) in the carbon fiber bundle (A) preferably satisfies the Expression (b). Such an isotropic random mat is preferable.

Meanwhile, in order to adjust the average number of fibers (N) in the carbon fiber bundle (A) to be within the range, in the manufacturing method of the random mat, it is possible to control the average number of fibers by adjusting the size of the fiber bundle fed to the cutting step, for example, the width of the bundle or the number of the carbon fibers per the width. Specifically, there are a method in which the width of the carbon fiber bundle is widened by the extending or the like and fed to the cutting step and a method in which a slit step is provided before the cutting step. Also, the fiber bundle may be cut and slit at the same time.

In the isotropic random mat, when a fiber areal weight of carbon fibers is within a range from 25 g/m² to 4500 g/m², the ratio of the carbon fiber bundle (A) constituted by the carbon fibers of the critical number of single fiber or more, the critical number defined by the Expression (a), with respect to the total amount of the carbon fibers is within the above-described range, the average number of fibers (N) in the carbon fiber bundle (A) satisfies the above-described Expression (b), the moldability, the mechanical strength, the smoothness of the surface, and the surface appearance of the decorative molded article are excellent, and the balance is excellent.

In the fiber-reinforced resin shaped product manufactured by using the random mat containing the above-described thermoplastic resin (P1) as a precursor, placing it in the heated mold, molding under pressurization by a method described below, the carbon fibers are not aligned in a specific direction and are arranged so as to be arranged in random directions in the plane. That is, the fiber-reinforced resin shaped product to be used in the present invention has an in-plane isotropy. The isotropy in the in-plane directions of the fiber-reinforced resin shaped product and the decorative molded article obtained therefrom, which is the final shaped product, tends to be maintained from the isotropy of the precursor of the fiber-reinforced resin shaped product. In the fiber-reinforced resin shaped product or the decorative molded article, it is possible to quantitatively evaluate the isotropy in the in-plane directions by obtaining a ratio of tensile moduli in two directions orthogonal to each other. Specifically, among values of the tensile moduli in two directions orthogonal to each other, when the ratio which is obtained by dividing the greater value by the smaller value does not exceed 2, it is evaluated that the isotropy is achieved, and when the ratio does not exceed 1.3, it is evaluated that the isotropy is excellent.

The length of the carbon fiber is represented by the average fiber length of the carbon fibers in the fiber-reinforced resin shaped product or the decorative molded article. As a measurement method of the average fiber length, for example, a method in which the fiber lengths of 100 fibers randomly extracted are measured up to a scale in 1 mm unit by a caliper or the like and the average of the fiber lengths is obtained is adopted. A preferable average fiber length of the carbon fibers is 3 mm to 100 mm. The random mat may be constituted by the carbon fibers having a single fiber length, or the carbon fibers having fiber lengths different from one another.

As described above, the average fiber diameter of the carbon fibers is 5 μm to 20 μm, and particularly preferably 5 μm to 12 μm, and adhesive strength between the carbon fibers and the thermoplastic resin (P1) which is a matrix is preferably 5 MPa or more in a tensile shear test of the strand. It is possible to improve the strength by a method in which surface oxygen density ratios (O/C) of the carbon fibers is changed in addition to the selection of the matrix, a method in which the adhesive strength between the carbon fibers and the thermoplastic resin (P1) is enhanced by adding a sizing agent to the carbon fibers, or the like.

Specifically, when the average fiber diameter of the carbon fibers is 5 μm to 7 μm, the critical number of single fiber defined by the Expression (a) is 86 to 120. In addition, when the average fiber diameter of the carbon fibers is 5 μm, the average number of the fibers in the carbon fiber bundle (A) is within a range of 240 or more and less than 4000, and preferably within a range from 300 to 2500. In addition, when the average fiber diameter of the carbon fibers is 7 μm, the average number of the fibers in the carbon fiber bundle (A) is within a range from 122 to 2040, preferably a range from 150 to 1500, and more preferably a range from 200 to 800.

Moreover, in the form of the carbon fiber bundle (A), a ratio of the carbon fiber bundles having the thicknesses of 100 µm or more is preferably less than 3% of the total number of the carbon fiber bundles (A). When the ratio of the carbon fiber bundles having the thicknesses of 100 µm or more is less than 3%, the thermoplastic resin (P1) is easily impregnated to the inner portion of the carbon fiber bundle, which is preferable. In order to adjust the ratio of the carbon fiber bundles having the thicknesses of 100 µm or more to be less than 3%, it is possible to control the thickness by widening the used carbon fiber to be thinned carbon fiber, or the like.

(Thermoplastic Resin (P1))

For example, as the kind of the thermoplastic reins (P1) which is used in the present invention and is the matrix, there is a vinyl chloride based resin, a vinylidene chloride-based resin, a vinyl acetate based resin, a polyvinyl alcohol based resin, a polystyrene based resin, an acrylonitrile-styrene based resin (AS resin), an acrylonitrile-butadiene-styrene based resin (ABS resin), an acrylic resin, a methacrylic resin, a polyethylene based resin, a polypropylene based resin, various thermoplastic polyamide based resins, a polyacetal based resin, a polycarbonate based resin, a polyethylene terephthalate based resin, a polyethylene naphthalate based resin, a polybutylene naphthalate based resin, a polybutylene terephthalate based resin, a polyarylate based resin, a polyphenylene ether based resin, a polyphenylene sulfide based resin, a polysulfone based resin, a polyethersulfone based resin, a polyetheretherketon based resin, or a polylactic acid based resin.

When the matrix is a crystalline resin, the manufacturing method of the decorative molded article in the present invention exhibits more excellent effects. The crystalline resin is largely shrunk at a crystallization temperature during the cooling process, and the thermal shrinkage coefficient thereof tends to be large. Thus, it is difficult to conceal the irregularity of the surface of the molded article or patterns of the carbon fibers by the conventional decoration method performed in the mold. However, when using the manufacturing method of the decorative molded article of the present invention, concealing can be surprisingly effectively achieved.

As a preferable crystalline resin, specifically, there may be a polyamide based resin such as nylon 6, a polyethylene terephthalate based resin, a polybutylene terephthalate based resin, a polyethylene based resin, a polypropylene based resin, a polyacetal based resin, a polyphenylene sulfide based resin, or the like. Among these, since the polyamide based resin, the polybutylene terephthalate based resin, and the polyphenylene sulfide based resin have excellent heat resistance and mechanical strength, or the like, these are suitably used.

As the nylon (hereinafter, may be abbreviated as "PA") which is one of the polyamide based resins, preferably, at least one kind is selected from a group consisting of PA6 (also referred to as polycaproamide, polycaprolactam, or poly ε-caprolactam), PA 26 (polyethylene adipamide), PA46 (polytetramethylene adipamide), PA66 (polyhexamethylene adipamide), PA69 (polyhexamethylene adipamide), PA610 (polyhexamethylene sebacamide), PA611 (polyhexamethylene undecamide), PA612 (polyhexamethylene dodecamide), PA11 (polyundecamide), PA12 (polydodecane amide), PA1212 (polydodecamethylene dodecamide), PA6T (polyhexamethylene terephthalamide), PA6I (polyhexamethylene isophthalamide), PA912 (polynonamethylene dodecamide), PA1012 (polydecamethylene dodecamide), PA9T (polynonamethylene terephthalamide), PA9I (polynonamethylene isophthalamide), PA10T (polydecamethylene terephthalamide), PA10I (polydecamethylene isophthalamide), PA11T (polyundecamethylene terephthalamide), PA 11I (polyundecamethylene isophthalamide), PA12T (polydodecamethylene terephthalamide), PA12I (polydodecamethylene isophthalamide), and polyamide MXD6 (polymethaxylylene adipamide).

The thermoplastic resin (P1) may be singly used, and two kinds or more of thermoplastic resins may be used in combination. If necessary, an additive agent such as a stabilizer, a flame retardant, a pigment, or a filler may be included.

(Manufacturing Method of Precursor of Fiber-Reinforced Resin Shaped Product)

A method for manufacturing the precursor of the fiber-reinforced resin shaped product in the present invention is not particularly limited, and preferably, a pressure molding method is used. In general, it is possible to maintain the lengths of the carbon fibers compared to an injection molding method in the pressure molding method, and thus it is possible to increase mechanical strength such as tensile strength or bending strength. The pressure molding method is not particularly limited, and specifically, there may be a press molding method, a compression molding method, an injection molding method (RTM), or the like. Here, from the above-described matters, since it is preferable to use the press molding method using the random mat, the press molding method is described below.

A UD sheet in which continuous fibers are arranged in one direction, and a paper sheet or a random mat constituted by discontinuous fibers is layered in a single layer state or a plurality of sheets or mats in a state where the thermoplastic resin exists, and then the sheets or mats are heated and pressed to melt the thermoplastic resin and to impregnate the thermoplastic resin into the fibers. Subsequently, cooling and pressurization are completed to solidify the thermoplastic resin. As a result, a precursor of the fiber reinforced resin shaped product may be obtained, wherein the thermoplastic resin is a matrix, and the precursor contains the continuous or discontinuous carbon fibers in the matrix. In this case, the thermoplastic resin may be supplied during the manufacturing of the sheet or the mat of the carbon fibers. Also, one or more layer (for example, a film or a sheet) made from the thermoplastic resin may be layered after manufacturing the sheet or the mat made of the carbon fibers, and then may be heated and pressurized so that the thermoplastic resin is impregnated into the sheet or the mat.

As other manufacturing methods of the precursor of the fiber-reinforced resin shaped product, a method in which a long-fiber pellet, that is, a pellet which is obtained by a process of adjusting molten thermoplastic resin to a specific viscosity, impregnating the thermoplastic resin into the carbon fibers in a continuous fiber form, and then cutting the carbon fibers, is used and molded in a desired shape with an injection molding machine, and a method in which the thermoplastic resin is melted and impregnated into an unidirectionally arranged sheet (UD sheet) in which strands of the continuous fibers are arranged to be parallel to one another may be adopted. However, the above-described method which the thermoplastic resin is melted and impregnated into the random mat is particularly preferable.

The precursor of the fiber-reinforced resin shaped product, which is particularly suitable in the present invention, is a precursor of the fiber-reinforced resin shaped product in which the carbon fiber bundle including the carbon fibers in which the average fiber length is 3 mm to 100 mm, and particularly 5 mm to 50 mm, and the thermoplastic resin are included so that the thermoplastic resin of a ratio from 30 parts by weight to 200 parts by weight is contained with respect to 100 parts by weight of the carbon fibers, in the precursor of the fiber-reinforced resin shaped product, (i) the precursor is formed in a sheet shape having a thickness of 0.5 mm to 5 mm, (ii) the carbon fibers are substantially randomly arranged in the in-plane directions, (iii) the total weight of the precursors is within a range from 25 g/m² to 4500 g/m², (iv) the ratio of the carbon fiber bundle (A) constituted by fibers of the critical number of single fiber or more, the critical number defined by the following Expression (a), is 20 Vol % to 99 Vol % with respect to the all carbon fibers, and (v) the average number of fibers (N) in the carbon fiber bundle (A) satisfies the following Expression (c).

Critical number of single fiber=600/D   (a)

$0.7 \times 10^4/D^2 < N < 1 \times 10^5/D^2$   (c)

(Here, D is the average fiber diameter (μm) of single carbon fibers). The configuration of the precursor is substantially same as the configurations of the fiber-reinforced resin shaped product and the decorative molded article.

(Configuration and Shape of Fiber-Reinforced Resin Shaped Product and Precursor)

In the present invention, the fiber-reinforced resin shaped product and the precursor include the carbon fibers and the thermoplastic resin (P1) which is a matrix.

The content of the thermoplastic resin in the fiber-reinforced resin shaped product or the precursor is preferably within a range from 30 parts by weight to 200 parts by weight with respect to 100 parts by weight of the carbon fibers. More preferably, the thermoplastic resin is 30 parts by weight to 150 parts by weight with respect to 100 parts by weight of the carbon fibers, and still more preferably, the thermoplastic resin is 35 parts by weight to 100 parts by weight with respect to 100 parts by weight of the carbon fibers. When the thermoplastic resin is less than 30 parts by weight with respect to 100 parts by weight of the carbon fibers, many carbon fibers which do not come into contact with the thermoplastic resin or are not impregnated into the thermoplastic resin are present, and thus the characteristics of the thermoplastic resin may not be sufficiently developed. In addition, when the thermoplastic resin exceeds 200 parts by weight, the carbon fibers are too small, and thus, the member is not preferable for the structural member of an automobile.

When it is represented by a content ratio of the carbon fibers, the content (Vf) of the carbon fibers in the fiber-reinforced resin shaped product or the precursor is 10% to 60% by volume, and preferably, 15% to 50% by volume. The content (Vf) is maintained in the decorative molded article.

Within a range in which the object of the present invention is not impaired, an additive agent such as various fibrous or nonfibrous fillers formed of organic fibers or inorganic fibers, a flame retardant, a UV resistant agent, a stabilizer, a mold releasing agent, a pigment, a softening agent, a plasticizer, or surfactant may be included in the fiber-reinforced resin shaped product or the precursor to be used in the present invention.

Meanwhile, the shape of the fiber-reinforced resin shaped product obtained from the precursor may be any shape of a flat plate shape such as a sheet or mat, a prism shape, and a cylindrical shape, and may include not only a flat surface but also a curved surface or a bent surface (for example, a hat shape). In consideration of moldability, and particularly, formability with the mold, the thickness is preferably within a range from 0.5 mm to 10 mm, and more preferably, a range from 1 to 5 mm. As long as the thickness of the fiber-reinforced resin shaped product is within the range, the thickness may be constant or the thicknesses may be varied.

(Manufacturing Method of Fiber-Reinforced Resin Shaped Product)

The manufacturing method of the fiber-reinforced resin shaped product in the present invention is not particularly limited. However, it is possible to manufacture the fiber-reinforced resin shaped product by heating and pressurizing the above-described precursor of the fiber-reinforced resin shaped product. Specifically, from the viewpoint of productivity, it is preferable that the fiber-reinforced resin shaped product is molded by the pressurization-molding process (i') by using the precursor of the fiber-reinforced resin shaped product before a decoration process described below is performed because it is possible to use the same mold (fixed mold). Two sheets or more of precursors of the fiber-reinforced resin shaped product may be layered to manufacture the fiber-reinforced resin shaped product.

As an example of a press molding method, the precursor of the fiber-reinforced resin shaped product is heated to be plasticized immediately before the precursor is pressurized by a press and is plasticized, and thus, the thermoplastic resin including the carbon fibers becomes a softened state. The precursor in this state is molded under pressurization by press. As a press method, both of hot press and cold press may be adopted, and in consideration of the productivity, the cold press is preferable. When the cold press is adopted, as a method of heating the precursor, it is possible to use a hot-air dryer, an infrared heater, or the like. Subsequently, the precursor plasticized by the heating is introduced and placed in to a mold heated to a constant temperature.

The heating temperature is preferably equal to or more than a melting temperature +15° C. of the thermoplastic resin and a decomposition temperature −30° C. or less. When the heating temperature is less than or equal to the range, since the thermoplastic resin is not melted, the thermoplastic resin is difficult to be molded, and when the heating temperature is more than the range, the thermoplastic resin may be decomposed. In addition, when the thermoplastic resin included in the precursor has water absorption ability, preferably, the precursor is dried in advance.

In the case of the cold press, the heated precursor is introduced into the mold, and thus, the fiber-reinforced resin shaped product is molded by the press forming. A pressurization condition is 0.1 MPa to 20 MPa, preferably 0.2 MPa to 15 MPa, and more preferably 0.5 MPa to 10 MPa. When the pressure is less than 0.1 MPa, the precursor is not sufficiently pressed, and thus, springback or the like may be occurred. In this case, the mechanical strength of the obtained fiber-reinforced resin shaped product or decorative molded article may be decreased. In addition, when the pressure exceeds 20 MPa, for example, when the precursor is large, a very large press machine is required, and thus, it may not be economically preferable. Moreover, since the melted thermoplastic resin is cooled and solidified, and thus the fiber-reinforced resin shaped product is formed, the heating condition during the pressurization is preferably below 20° C. or less than a crystal dissolution temperature when the thermoplastic resin is crystalline, and the heating condition is preferably below 20° C. or less than a glass transfer temperature when the thermoplastic resin is amorphous.

(Decoration Process)

In the present invention, from the viewpoint of enhancement of the productivity, it is preferable that the obtained fiber-reinforced resin shaped product is subsequently subjected to decoration steps (i) to (iv). Specifically, as a decorative material, the thermosetting resin and the thermoplastic resin (P2) is injected into a gap between a side of the fiber-reinforced resin shaped product to be coated, the fiber-reinforced resin shaped product obtained by molding under pressurization and the mold facing the side, a film is formed by solidifying it using the heat of both the fiber-reinforced resin shaped product and the mold, and at the same time the layer is joined to the fiber-reinforced resin shaped product, and the mold is opened and the resultant is removed therefrom.

The step (i) is a step of placing the fiber-reinforced resin shaped product into a heated mold. In general, the fiber-reinforced resin shaped product is placed so that the surface to be decorated of the fiber-reinforced resin shaped product faces the above in the mold. The mold is heated to some extent and is warm in order to harden by reaction or melt the decorative material and to make the decorative material come into contact with the surface to form the layer. When the thermosetting resin is used as a decorative material, it is necessary to set the heating temperature to a temperature range in which the thermosetting resin is not hardened before the mold is closed. The heating temperature is dependent on the kind of the used thermosetting resin. However, in general, the heating temperature is preferably within a range of the hardening temperature ±30° C. of the thermosetting resin. When the thermoplastic resin (P2) is used as a decorative material, from the viewpoint of safety, the thermoplastic resin is preferably not melted before the mold is closed. The heating temperature is dependent on the kind of the used thermoplastic resin (P2). However, in general, the heating temperature is preferably within a range from the melting temperature −50° C. of the thermoplastic resin (P2) to the melting temperature +20° C.

The step (ii) is performed following the step (i). The thermosetting resin or the thermoplastic resin (P2) is introduced into the mold as a decorative material. At this time, it is preferable that the thermosetting resin or the thermoplastic resin (P2) is introduced onto at least one surface to be decorated of the shaped product placed in the mold. An introducing method will be described in the following step (iii).

The step (iii) is performed following the step (ii). The thermosetting resin or the thermoplastic resin (P2) is pressurized to perform molding inside the mold.

Here, the case where thermosetting resin is used as a decorative material and the case where the thermoplastic resin (P2) is used as a decorative material are separately described.

(Case where Decorating Material is Thermosetting Resin)

In the present invention, the decorative material including the thermosetting resin is not particularly limited. However, specifically, there may be an epoxy based resin, an urethane based resin, an acrylic resin, a thermosetting styrene based resin, a thermosetting polyester based resin, or the like. Moreover, either a two-pack curable type or a single-pack curable type may be used. It is preferable that a proper combination of the decorative materials is selected depending on the use in consideration of the adhesion between the surface of the fiber-reinforced resin shaped product and the decorative material.

The injection amount of the thermosetting resin is appropriately selected depending on the surface area to be coated of the fiber-reinforced resin shaped product and the desired thickness of the layer.

A method of introducing the thermosetting resin into the mold is not particularly limited. For example, there is a method in which the thermosetting resin is injected by a cylinder or the like in a state where the mold is closed or a method in which the thermosetting resin is put on the surface of the fiber-reinforced resin shaped product in the state where the mold is opened and the thermosetting resin is spread on the surface by closing the mold again.

After the thermosetting resin is introduced into the mold, the mold is closed, and thus, the thermosetting resin is pressurized and heated to the temperatures of the mold and the surface of the shaped product to be hardened. For example, the pressure during the pressurization is within a range from 2 MPa to 50 MPa, and preferably a range from 5 MPa to 35 MPa. In order to increase a probability that thermal dissociation on the thermoplastic resin (P1) constituting the fiber-reinforced resin shaped product occurs, the surface temperature of the mold in the steps (ii) and (iii) of the present invention is 120° C. to 180° C., more preferably 125° C. to 170° C., and still more preferably 130° C. to 160° C. When the surface temperature of the mold is less than 120° C., the thermal dissociation of the thermoplastic resin is difficult to be occurred, and thus, the reaction between the thermosetting resin and the fiber-reinforced resin shaped product (of the surface) is difficult to be occurred. Also, the joining therebetween is not sufficient, and therefore peeling may be generated on the surface of the obtained decorative molded article. When the surface temperature of the mold exceeds 180° C., the reaction and the hardening of the thermosetting resin are too fast, the thermosetting resin becomes to be flowed, and a portion in which the layer is not formed on the surface of the fiber-reinforced resin shaped product may be generated.

A hardening time of the thermosetting resin is from 20 seconds to 6 minutes, and preferably, is from 60 seconds to 4 minutes. When the hardening time is shorter than 20 seconds, the hardening reaction of the thermosetting resin is not sufficient, the strength of the film is deficient, and thus, disadvantages such as cracks may be generated. When the hardening time exceeds 6 minutes, although the hardening reaction is sufficient, the productivity is decreased.

(Case where Decorating Material is Thermoplastic Resin (P2))

In the present invention, the kind of the thermoplastic resin (P2) is not particularly limited. For example, it is possible to use a so-called hot-melt agent. The hot-melt agent is not particularly limited, and there may be an ethylene vinyl acetate based resin, a polyolefin based resin, a polyamide based resin, a polyurethane based resin, or the like. It is preferable that a proper combination of the decorative materials is selected depending on the use in consideration of the adhesion between the surface of the fiber-reinforced resin shaped product and the decorative material. It is required that a softening point of the thermoplastic resin (P2) is lower than a softening point of the thermoplastic resin (P1) constituting the fiber-reinforced resin shaped product. In addition, as the decorative material, the hot-melt agent and the film may be combined. From the viewpoint of the adhesion, the thermoplastic resin (P2) uses more preferably the thermoplastic resin which is the same kind as the thermoplastic resin (P1).

As described above, the fiber-reinforced resin shaped product is subjected to the decoration step by the thermoplastic resin (P2) inside the mold. Specifically, the thermoplastic resin (P2) is introduced between the surface to be coated of the fiber-reinforced resin shaped product and the mold facing the surface. Next, the mold is closed, the thermoplastic resin (P2) is pressurized, and the thermoplastic resin (P2) is spread by the heat of both the fiber-reinforced resin shaped product and the mold. For example, the pressure during the pressurization is within a range from 2 MPa to 50 MPa, and preferably a range from 5 MPa to 35 MPa. The thermoplastic resin (P2) is solidified during the cooling step, and thus, fixation and joining between the surface of the fiber-reinforced resin shaped product and the thermoplastic resin are occurred.

The introducing amount of the thermoplastic resin (P2) is appropriately selected depending on the surface area to be coated of the fiber-reinforced resin shaped product and the desired thickness of the film.

A method of introducing the thermoplastic resin into the mold is not particularly limited. For example, in the case where the thermoplastic resin (P2) or a material including the thermoplastic resin (P2) is used, there is a method in which the thermoplastic resin (P2) or the material which is in a flowable state by heating is injected into the mold by using a cylinder in a state where the mold is closed, or a method in which a film made from the thermoplastic resin is heated and put on the surface of the fiber-reinforced resin shaped product in the state where the mold is opened, the film is softened by closing the mold again, the film is melt to spread the melted film.

In order to increase a probability that thermal dissociation on the thermoplastic resin (P1) constituting the fiber-reinforced resin shaped product occurs, the surface temperature of the mold in the steps (ii) and (iii) of the present invention is 120° C. to 180° C., more preferably 125° C. to 170° C., and still more preferably 130° C. to 160° C. When the surface temperature of the mold is less than 120° C., the thermal dissociation of the thermoplastic resin is difficult to be occurred. Accordingly, the reaction between the thermoplastic resin (P2) and the fiber-reinforced resin shaped product (of the surface) is difficult to be occurred, the joining therebetween is not sufficient, and thus, peeling may be occurred. When the surface temperature exceeds 180° C., since the cooling requires much time, the production time is long, and thus, it is not advantageous.

Meanwhile, in the both cases of using the thermosetting resin or the thermoplastic resin as a decorative material, in order to smoothly perform removal (detachment) from the mold and to prevent tear or damage (break) of the decorative molded article itself due to the tear of the layer by adhesion of a portion or the entirety of the layer to the mold, coating may be performed on the surface of the mold or a mold release agent may be applied on the surface of the mold.

(Pressure Holding Step)

A pressure holding step corresponds to the step (iv). The inside of the mold is cooled, while maintaining the pressure of the inside of the mold to be within a range from 2 MPa to 50 MPa, to a temperature range from 10° C. to a glass transition point temperature when the thermoplastic resin (P1) is an amorphous resin and the glass transition point temperature is 10° C. or more, to a temperature range from 10° C. to a crystallization temperature when the thermoplastic resin (P1) is a crystalline resin and the crystallization temperature is 10° C. or more, and to a temperature range from 10° C. to 80° C. when the thermoplastic resin (P1) is the amorphous resin and the glass transition point temperature is less than 10° C. or the thermoplastic resin (P1) is the crystalline resin and the crystallization temperature is less than 10° C. In the present invention, the glass transition point temperature and the crystallization temperature can be measured by JIS K7121 by using a differential scanning calorimeter (DSC).

In the present invention, surprisingly, by performing the pressure holding step (iv) after introducing the thermosetting resin or the thermoplastic resin (P2) into the mold and then pressurizing it, the patterns of the carbon fibers are difficult to appear on the surface, and thus, it is possible to obtain a decorative molded article having excellent surface appearance and excellent smoothness of the surface.

When the cooling temperature is equal to or more than the glass transition point in the case where the thermoplastic resin (P1) is the amorphous resin, or when the cooling temperature is equal to or more than the crystallization temperature in the case where the thermoplastic resin is the crystalline resin, the thermoplastic resin (P1) is largely shrunk by shrinkage according to vitrification or the crystallization or thermal shrinkage. Accordingly, the patterns of the carbon fibers appear on the surface of the obtained decorative molded article. Moreover, the inside of the mold being cooled to 10° C. or less is not preferable considering the productivity. Meanwhile, when the thermoplastic resin is the amorphous resin and the glass transition point temperature is less than 10° C., or when the thermoplastic resin is the crystalline resin and the crystallization temperature is less than 10° C., if the inside of the mold is cooled while being held to the range from 10° C. to 80° C., the patterns of the carbon fibers do not nearly appear on the surface. As an example of the thermoplastic resin in which the thermoplastic resin is the amorphous resin and the glass transition point temperature is less than 10° C., or when the thermoplastic resin is the crystalline resin and the crystallization temperature is less than 10° C., there is elastomer.

More preferably, the inside of the mold is cooled: to a temperature range from 20° C. to the glass transition point temperature when the thermoplastic resin (P1) is the amorphous resin and the glass transition point temperature is 10° C. or more; to a temperature range from 20° C. to the crystallization temperature when the thermoplastic resin (P1) is the crystalline resin and the crystallization temperature is 10° C. or more; and to a temperature range from 20° C. to 80° C. when the thermoplastic resin (P1) is the amorphous resin and the glass transition point temperature is less than 10° C. or the thermoplastic resin (P1) is the crystalline resin and the crystallization temperature is less than 10° C.

The range of the held pressure is 2 MPa to 50 MPa. If the pressure is less than 2 MPa when the pressure is held, the decorative molded article having insufficient surface smoothness is obtained. When the upper limit of the pressure exceeds 50 MPa, the adhesion between the layer made from the hardened thermosetting resin or the solidified thermoplastic resin (P2) and the mold is too strong, a portion or the entirety of the layer adheres to the mold, and thus, there is a concern that the tear of the layer or the damage (break) of the decorative molded article itself due to the tear of the film may occur. The pressure is preferably within a range from 5 MPa to 40 MPa, and more preferably, the pressure is within a range from 10 MPa to 40 MPa. Moreover, the pressure when the pressure is held may be the same as the pressure when the thermosetting resin or the thermoplastic resin (P2) is injected into the mold and the thermosetting resin or the thermoplastic resin is hardened or melted by heating. That is, the pressure when the pressure is held may be the same as the pressure in the step (iii). In this case, in the state where the thermosetting resin or the thermoplastic resin (P2) injected into the mold is pressurized and is hardened or melt by heating, the mold is cooled while the pressure inside the mold is constantly held.

In the step (iv), "the pressure being held within the range from 2 MPa to 50 MPa inside the mold" means that the pressure may be held in a constant value, the pressure may be increased or decreased in stages, or the pressure may be continuously increased or decreased within the range. If it is within the cooling time, the pressure changes may be combined. In the present invention, from the viewpoint of the smoothness of the surface, the surface appearance and the durability, preferably, the pressure is held in a constant value.

In the step (iv), as described above, the inside of the mold is cooled while the pressure inside the mold is held. The cooling time, that is, the pressure holding time is not particularly limited, and the pressure holding time is 0.5 minutes to 10 minutes, and preferably 0.5 minutes to 3 minutes. If the cooling time is shorter than 0.5 minutes, the cooling is liable to be insufficient, and if the cooling time is longer than 10 minutes, the process time is lengthened, and thus, the productivity may be decreased.

(Decorative Molded Article)

The decorative molded article obtained according to the present invention includes the layer on at least a portion of the surface thereof. Accordingly, the carbon fibers (particularly, carbon fiber bundles) are difficult to appear on the surface (the layer portion) of the decorative molded article, and thus, the smoothness of the surface is excellent. As the smoothness, irregularities of the layer surface are generally within a range from 1 µm to 5 µm by Ra, and preferably a range from 1 µm to 3 µm by Ra.

Moreover, in the decorative molded article obtained according to the present invention, when the thermosetting resin is used as a decorative material, the thickness of the layer is preferably within a range from 50 µm to 200 µm. When the thickness is less than 50 µm, the surface of the decorative molded article may not be sufficiently concealed. When the thickness exceeds 200 µm, much time is required for hardening the thermosetting resin, and thus, it is not preferable in the process. Preferably, the thickness is within a range from 80 µm to 180 µm, and more preferably, the thickness is within a range from 100 µm to 200 µm. When the thermoplastic resin is used as a decorative material, the thickness of the layer is preferably within a range from 30 µm to 500 µm. When the thickness is less than 30 µm, the surface of the decorative molded article may not be sufficiently concealed. When the thickness exceeds 500 µm, much time is required for cooling the thermoplastic resin, and thus, it is not preferable in the process. Preferably, the thickness is within a range from 50 µm to 400 µm, and more preferably, the thickness is within a range from 100 µm to 200 µm.

A method of controlling the thickness of the decorative material is not particularly limited. For example, there is a method in which the mold is opened by the thickness of the layer to be decoratively molded to inject the decorative material into the mold after placing the fiber-reinforced resin shaped product in the mold, a method in which a bank or the like designed so as to be the thickness of the layer to be decoratively molded on the fiber-reinforced resin shaped product is formed and the decorative material is injected therein, and a method in which the amount of the decorative material to be introduced is appropriately controlled.

According to the present invention, there may be provided the decorative molded article having few irregularities on the surface of the fiber-reinforced resin shaped product, having excellent smoothness of the surface, fine appearance, and excellent surface appearance, in which the carbon fiber bundles are not nearly viewed, even when the carbon fiber bundles are contained. In addition, in the decorative molded article, the layer covering the surface strongly comes into close contact with the carbon fiber resin shaped product, and the durability is excellent.

That is, the present invention includes the decorative molded article which has the layer made from the thermosetting resin or the thermoplastic resin (P2) on the surface of the fiber-reinforced resin shaped product including the carbon fibers and the thermoplastic resin (P1), wherein the fiber-reinforced resin shaped product includes some carbon fibers being in a form of fiber bundle.

EXAMPLE

Hereinafter, the present invention will be in more detail in Examples. Each physical property was measured according to the following method.

In addition, each value in Examples was obtained according to the following method. (1) In the measurement of the average fiber length of the carbon fibers, a molded plate (I) was heated to 500° C. to remove the resin, fiber lengths of 300 fibers which were randomly extracted from the structure substantially constituted by the remaining carbon fibers were measured by 1 mm unit by using a caliper, and the average of the fiber lengths was obtained. The average thickness and the weight-average fiber width of the carbon fiber bundles were obtained from the weight values of the fiber bundles by measuring the thicknesses and the widths of 300 fiber bundles randomly extracted from the structure by 1 mm unit by using a caliper. (2) Analysis (critical number of single fiber, average single fiber number (N)) of the fiber bundles of the molded plate (I) was performed based on the method disclosed in PCT/JP2011/70314 (International Publication No. WO2012/105080). (3) The irregularities (Ra) of the surface of the decorative molded article were measured by using a contact type roughness meter (SJ-210 manufactured by Mitutoyo Co. Ltd). (4) The fiber patterns on the surface of the decorative molded article were visually observed.

Manufacture Example 1

Manufacturing of Flat Plate Using Mat (1)

Carbon fiber "TENAX" (registered trademark) STS40-24KS (average fiber diameter was 7 µm, manufactured by Toho Tenax Co. Ltd) which was cut to the average fiber length of 20 mm was used as the carbon fibers, Nylon 6 resin A1030 (crystallization temperature 172° C.) manufactured by Unitika Co. Ltd was used as the matrix, and thus, a mat (random mat including the thermoplastic resin) in which the carbon fibers was randomly oriented in the plane was formed.

In the obtained mat, the fiber areal weight of carbon fiber was 1800 g/m$^2$, and the areal weight of nylon resin was 1500 g/m$^2$. The mat was placed in the mold having a concave portion on the upper portion. Next, the mat was pressurized during 5 minutes at the pressure of 2.0 MPa using a press device heated to 260° C., and the molded plate (I) having the thickness of 2.3 mm was obtained. Meanwhile, the molded plate (I) obtained in this way corresponds to the precursor of the fiber-reinforced resin shaped product in the present invention.

With respect to the obtained molded plate (I), the analysis of the carbon fibers included in the molded plate was performed, and as a result, the critical number of single fiber defined by the Expression (a) was 86, and the average single fiber number (N) in the carbon fiber bundles (A) constituted by fibers of the critical number of single fiber or more was 420. The ratio of the carbon fiber bundle (A) constituted by fibers of the critical number of single fiber or more was 85 Vol % of the total amount of the carbon fibers. In addition, the volume content of the carbon fibers was 43% (the content 54% of the carbon fibers based on the weight). Also, the average thickness of the carbon fiber bundles was 30 µm, and the weight-average fiber width was 0.5 mm.

Manufacture Example 2

Preparation of Decorating Material Used in Thermosetting Resin 1 part by weight of tert-butyl benzoylperoxide was added to 65 parts by weight of "Glass Clad AC18 Gray" (manufactured by Dai Nippon Toryo Co. Ltd, and main components: urethane acrylate compound, epoxy acrylate, styrene, and filler), was agitated at room temperature, and thus, the decorative material was prepared.

Manufacture Example 3

Manufacturing of Flat Plate Using Mat (2)

Carbon fiber "TENAX" (registered trademark) STS40-24KS (average fiber diameter was 7 µm, manufactured by Toho Tenax Co. Ltd) which was cut to the average fiber length of 20 mm was used as the carbon fibers, polycarbonate resin "PANLITE" (registered trademark) L-1225L (glass transition point temperature 150° C.) manufactured by Teijin Co. Ltd was used as the matrix, and thus, a mat (random mat including the thermoplastic resin) in which the carbon fibers was randomly oriented in the plane was manufactured.

In the obtained mat, the fiber areal weight of carbon fiber was 1080 g/m$^2$, and the areal weight of the polycarbonate resin was 1680 g/m$^2$. The mat was placed in the mold having a concave portion on the upper portion. Next, the mat was pressurized during 5 minutes at the pressure of 2.0 MPa using a press device heated to 260° C., and the molded plate (II) having the thickness of 2.2 mm was obtained. Meanwhile, the molded plate (II) obtained in this way corresponds to the precursor of the fiber-reinforced resin shaped product according to the present invention.

With respect to the obtained molded plate (II), the analysis of the carbon fibers included in the molded plate was performed, and as a result, the ratio of the carbon fibers being contained in the form of fiber bundle was 95% (weight ratio) with respect to the total amount of the carbon fibers. The critical number of single fiber defined by the Expression (a) was 86, and the average single fiber number (N) in the carbon fiber bundles (A) constituted by fibers of the critical number of single fiber or more was 240. The ratio of the carbon fiber bundle (A) constituted by fibers of the critical number of single fiber or more was 35 Vol % of the total amount of the carbon fibers. In addition, the volume content of the carbon fibers was 30% (the content 39% of the carbon fibers based on the weight). Also, the average thickness of the carbon fiber bundles was 30 µm, and the weight-average fiber width was 0.5 mm.

Example 1

The molded plate (I) obtained in Manufacture Example 1 was cut to 195 mm×245 mm and dried for 4 hours at 120° C. by a hot-air dryer, and thereafter, the molded plate was heated to 300° C. by an infrared heater. Separately, a mold for a flat plate (fixed mold (first moveable mold)) of 200 mm×250 mm was set to 140° C. Two heated molded plates (I) were layered and introduced into the mold and were pressurized for 1 minute by a press pressure of 10 MPa. The shaped product obtained by the operation corresponds to the fiber-reinforced resin shaped product according to the present invention.

The mold was opened, the fixed mold slid to move to the second movable mold. Thereafter, 5 mL of the decorative material prepared in Manufacture Example 2 dropped on the center of one surface of the obtained molded plate (I) by using a cylinder. After the dropping, the second movable mold was closed and was pressurized for 3 minutes at 140° C. and 7 MPa, and the thermoplastic resin was hardened. In 3 minutes, cooling water was introduced into the mold in the state where the pressure of 7 MPa was maintained and cooled the mold down to 45° C. for 5 minutes, and thus, a decorative molded article in which the film was formed on one surface was obtained. The thickness except for the layer of the decorative molded article was 2.0 mm.

The irregularity of the surface (layer forming surface) of the obtained decorative molded article satisfied Ra=3 µm. When the surface was visually observed, if the surface was shaded from light, the patterns of the carbon fibers were dimly viewed, and conspicuous patterns were not observed. Minute wrinkles were not also observed. The thickness of the layer was measured, and as a result, the thickness was 200 µm. In addition, peeling test was performed based on JIS K5600 on a portion in which the patterns of the fiber bundles were dimly viewed, and as a result, the layer was not peeled, and excellent durability was achieved.

Example 2

A decorative molded article was obtained by performing the operations similar to Example 1 except that the pressure during the decoration was 30 MPa.

The irregularity of the surface of the obtained decorative molded article satisfied Ra=2 µm. When the surface was visually observed, if the surface was shaded from light, the patterns of the carbon fibers were dimly viewed, and conspicuous patterns were not observed. The thickness of the layer was measured, and as a result, the thickness was 200 µm. In addition, peeling test was performed based on JIS K5600 on a portion in which the patterns of the fiber bundles were dimly viewed, and as a result, the layer was not peeled.

Example 3

A decorative molded article was obtained by performing the operations similar to Example 1 except that the pressure during the decoration was 2.5 MPa.

The irregularity of the surface of the obtained decorative molded article satisfied Ra=4 µm. When the surface was visually observed, if the surface was shaded from light, the patterns of the carbon fibers were dimly viewed, and conspicuous patterns were not observed. The thickness of the layer was measured, and as a result, the thickness was 200 µm. In addition, peeling test was performed based on JIS K5600 on a portion in which the patterns of the fiber bundles were dimly viewed, and as a result, the layer was not peeled.

Example 4

The molded plate (I) obtained in Manufacture Example 1 was cut to 195 mm×245 mm and dried for 4 hours at 120° C. by the hot-air dryer, and thereafter, the molded plate was heated to 300° C. by an infrared heater. The mold for a flat plate of 200 mm×250 mm including a decorative material injection port in the center and a paint leakage prevention packing in the peripheral terminal was set to 140° C. Two heated molded plates (I) were layered and directly placed in the mold. Next, the molded plates were heated for 1 minute at the press pressure of 10 MPa, and the fiber-reinforced resin shaped product according to the present invention was manufactured.

Subsequently, 5 mL of the decorative material prepared in the Manufacture Example 2 was injected into the mold for approximately 1 second at the pressure of 20 MPa (the pressure when the injection was performed immediately below the injection cylinder), using an in-mold coat injection machine (manufactured by Met Japan Co. Ltd). In a state where the mold was pressurized at 20 MPa and 140° C. for 3 minutes, the thermosetting resin was hardened by reaction. After the thermosetting resin was hardened, cooling water was introduced into the mold in the state where the pressure of 20 MPa was maintained and cooled the mold down to 45° C. for 5 minutes, and thus, a decorative molded article in which the layer was formed on one surface was obtained. The thickness except for the layer of the decorative molded article was 2.0 mm.

The one surface of the obtained decorative molded article was visually observed, and as a result, minute wrinkles were not viewed, and the surface was very flat (the irregularity satisfied Ra=4 μm). Although the one surface was shaded from light, patterns of the carbon fibers were dimly viewed. The thickness of the layer was measured, and as a result, the thickness was 100 μm. Also, peeling test was performed based on JIS K5600 on a portion in which the patterns of the fiber bundles were dimly viewed, and as a result, the layer was not peeled.

Example 5

The molded plate (II) obtained in Manufacture Example 3 was cut to 195 mm×245 mm and dried for 4 hours at 120° C. by a hot-air dryer, and thereafter, the molded plate was heated to 300° C. by an infrared heater. Separately, a mold for a flat plate (fixed mold (first moveable mold)) of 200 mm×250 mm was set to 120° C. Two heated molded plates (II) were layered and introduced into the mold and were pressurized for 1 minute by a press pressure of 10 MPa. The shaped product obtained by the operation corresponds to the fiber-reinforced resin shaped product according to the present invention.

The mold was opened, the fixed mold slid to move to the second movable mold. Thereafter, 5 mL of the decorative material prepared in Manufacture Example 2 dropped on the center of one surface of the obtained molded plate by using a cylinder. After the dropping, the second movable mold was closed, was pressurized for 3 minutes at 140° C. and 15 MPa, and the thermoplastic resin was hardened. In 3 minutes, cooling water was introduced into the mold in the state where the pressure of 15 MPa was maintained and cooled the mold to 45° C. for 5 minutes, and thus, a decorative molded article in which the layer was formed on one surface was obtained. The thickness except for the layer of the decorative molded article was 2.0 mm.

The irregularity of the surface (layer forming surface) of the obtained decorative molded article satisfied Ra=3 μm. When the surface was visually observed, if the surface was shaded from light, the patterns of the carbon fibers were dimly viewed, and conspicuous patterns were not observed. Minute wrinkles and roughness were not also observed. The thickness of the layer was measured, and as a result, the thickness was 200 μm. In addition, peeling test was performed based on JIS K5600 on a portion in which the patterns of the fiber bundles were dimly viewed, and as a result, the layer was not peeled, and excellent durability was achieved.

Comparative Example 1

A decorative molded article was obtained by performing the operations similar to Example 1 except that cooling was not performed after the thermosetting resin was responded and hardened.

The irregularity of the surface of the obtained decorative molded article satisfied Ra=10 μm. The surface was visually observed, and as a result, the patterns of carbon fibers were clearly observed. The thickness of the layer was measured, and as a result, the thickness was 200 μm.

Comparative Example 2

A decorative molded article was obtained by performing the operations similar to Example 3 except that cooling was not performed after the thermosetting resin was responded and hardened.

The irregularity of the surface of the obtained decorative molded article satisfied Ra=10 μm. The surface was visually observed, and as a result, the patterns of carbon fibers were clearly observed. The thickness of the layer was measured, and as a result, the thickness was 100 μm.

Comparative Example 3

A decorative molded article was obtained by performing the operations similar to Example 1 except that the pressure inside the mold was set to 0.2 MPa when the thermosetting resin was hardened by the response.

The irregularity of the surface of the obtained decorative molded article satisfied Ra=7 μm. The surface was visually observed, and as a result, the patterns of the carbon fibers were clearly observed. The thickness of the layer was measured, and as a result, the thickness was 200 μm. Also, peeling test was performed on the portion, in which the patterns of the fiber bundles were dimly viewed, based on JIS K5600, and as a result, the layer was easily peeled.

Comparative Example 4

A decorative molded article was obtained by performing the operations similar to Example 3 except that the pressure was set to 1.5 MPa.

The irregularity of the surface of the obtained decorative molded article satisfied Ra=6 μm. The surface was visually observed, and as a result, the patterns of the carbon fibers were clearly observed. The thickness of the layer was measured, and as a result, the thickness was 200 μm.

Example 6

The molded plate (I) obtained in Manufacture Example 1 was cut to 195 mm×245 mm and dried for 4 hours at 120° C. by a hot-air dryer, and thereafter, the molded plate was heated to 300° C. by an infrared heater. Separately, the mold for a flat plate (fixed mold (first movable mold)) having the size of 200 mm×250 mm was set to 140° C. Two heated molded plates (I) were layered and directly placed in the mold. Next, the molded plates were heated for 1 minute at the press pressure of 20 MPa, and the fiber-reinforced resin shaped product according to the present invention was manufactured.

The mold was opened, the fixed mold slid to move to the second movable mold. As the thermoplastic polyamide resin, a polyamide based hot-melt agent (MICROMELT (registered trademark) 6202 of Henkel Japan Co. Ltd) was heated to 160° C. by a heat gun to be heat-molten state, and thus, dropped on the center of the one surface of the obtained fiber-reinforced resin shaped product. After the dropping, the polyamide based hot-melt agent was pressurized for 1 minute at 160° C. and 20 MPa, and thus, was spread on the surface of the fiber-reinforced resin shape product. Thereafter, in the state where the pressure was constantly maintained, in 1 minute, cooling water was introduced into the mold and cooled the mold to 45° C. for 5 minutes, and thus, a decorative molded article was obtained. Meanwhile, a heat and cool system which uses the heated pressurized water was adopted when reheating the mold after the cooling.

Minute wrinkles were not viewed on the obtained decorative molded article, and the decorative molded article was very flat (the irregularity satisfied Ra=3 µm). When the one surface was visually observed, if the surface was shaded from light, the patterns of the carbon fibers were dimly viewed, and conspicuous patterns were not observed. The thickness of the layer was measured, and as a result, the thickness was 200 µm. In addition, peeling test was performed based on JIS K5600 on a portion in which the patterns of the fiber bundles were dimly viewed, and as a result, the layer was not peeled, and excellent durability was achieved.

Example 7

The decorative molded article was obtained by performing the operations similar to Example 6 except that the pressure during the decoration was 5 MPa.

The irregularity of the surface of the obtained decorative molded article satisfied Ra=4 µm. When the surface was visually observed, if the surface was shaded from light, the patterns of the carbon fibers were dimly viewed, and conspicuous patterns were not observed. The thickness of the layer was measured, and as a result, the thickness was 200 µm.

Example 8

The decorative molded article was obtained by performing the operations similar to Example 6 except that the pressure during the decoration was 2.5 MPa.

The irregularity of the surface of the obtained decorative molded article satisfied Ra=4 µm. When the surface was visually observed, if the surface was shaded from light, the patterns of the carbon fibers were dimly viewed, and conspicuous patterns were not observed. The thickness of the layer was measured, and as a result, the thickness was 200 µm.

Example 9

The molded plate (I) obtained in Manufacture Example 1 was cut to 195 mm×245 mm and dried for 4 hours at 120° C. by the hot-air dryer, and thereafter, the molded plate was heated to 300° C. by an infrared heater. The mold for a flat plate of 200 mm×250 mm including a decorative material injection port in the center and a paint leakage prevention packing in the peripheral terminal was set to 140° C. Two heated molded plates (I) were layered and directly placed in the mold. Next, the molded plates were heated for 1 minute at the press pressure of 20 MPa, and the fiber-reinforced resin shaped product according to the present invention was manufactured.

Subsequently, as the thermoplastic polyamide resin, a polyamide based hot-melt agent (MICROMELT (registered trademark) 6202 of Henkel Japan Co. Ltd) was injected for approximately 1 second at the pressure (pressure immediately below the injection cylinder) of 20 MPa by using an in-mold coat injection machine (manufactured by Met Japan Co. Ltd). The mold was pressurized for 3 minutes in a state of being maintained to 140° C., and the polyamide based hot-melt agent was pressed and spread on one surface of the fiber-reinforced resin shaped product. Thereafter, cooling water was introduced into the mold in the state where the pressure of 20 MPa was constantly maintained and cooled the mold to 45° C. for 5 minutes, and thus, a decorative molded article was obtained. The thickness except for the layer of the decorative molded article was 2.0 mm.

The irregularity of the obtained decorative molded article satisfied Ra=2 When the surface was visually observed, if the surface was shaded from light, the patterns of the carbon fibers were dimly viewed, and conspicuous patterns were not observed. The thickness of the layer was measured, and as a result, the thickness was 100 µm.

Example 10

The molded plate (II) obtained in Manufacture Example 3 was cut to 195 mm×245 mm and dried for 4 hours at 120° C. by a hot-air dryer, and thereafter, the molded plate was heated to 300° C. by an infrared heater. Separately, the mold for a flat plate (fixed mold (first movable mold)) having the size of 200 mm×250 mm was set to 120° C. Two heated molded plates (II) were layered and directly placed in the mold. Next, the molded plates were heated for 1 minute at the press pressure of 15 MPa, and the fiber-reinforced resin shaped product according to the present invention was manufactured.

The mold was opened, the fixed mold slid to move to the second movable mold. As the thermoplastic polyamide resin, a polyamide based hot-melt agent (MICROMELT (registered trademark) 6202 of Henkel Japan Co. Ltd) was heated to 160° C. by a heat gun to be heat-molten state, and thus, dropped on the center of the one surface of the obtained fiber-reinforced resin shaped product. After the dropping, the polyamide based hot-melt agent was pressurized for 1 minute at 160° C. and 15 MPa, and thus, was spread on the surface of the fiber-reinforced resin shape product. Thereafter, in the state where the pressure was constantly maintained, in 1 minute, cooling water was introduced into the mold and cooled the mold to 45° C. for 5 minutes, and thus, a decorative molded article was obtained. Meanwhile, a heat and cool system which uses the heated pressurized water was adopted when reheating the mold after the cooling.

Minute wrinkles and roughness were not viewed on the surface of the obtained decorative molded article, and the decorative molded article was very flat (the irregularity satisfied Ra=3 µm). When the one surface was visually observed, if the surface was shaded from light, the patterns of the carbon fibers were dimly viewed, and conspicuous patterns were not observed. The thickness of the layer was measured, and as a result, the thickness was 200 µm. In addition, peeling test was performed based on JIS K5600 on a portion in which the patterns of the fiber bundles were dimly viewed, and as a result, the layer was not peeled, and excellent durability was achieved.

Comparative Example 5

A decorative molded article was obtained by performing the operations similar to Example 6 except that the mold was cooled to 120° C. and the mold was immediately opened after the decorative material was hardened.

The irregularity of the surface of the obtained decorative molded article satisfied Ra=10 μm. The surface was visually observed, and as a result, patterns of the fibers were clearly observed. The thickness of the layer was measured, and as a result, the thickness was 200 μm.

Comparative Example 6

A decorative molded article was obtained by performing the operations similar to Example 9 except that the mold was cooled to 120° C. and the mold was immediately opened after the hot-melt agent was hardened.

The irregularity of the surface of the obtained decorative molded article satisfied Ra=10 μm. The surface was visually observed, and as a result, patterns of the carbon fibers were clearly observed. The thickness of the layer was measured, and as a result, the thickness was 100 μm.

Comparative Example 7

A decorative molded article was obtained by performing the operations similar to Example 6 except that the pressure during the decoration was 0.2 MPa.

The irregularity of the surface of the obtained decorative molded article satisfied Ra=7 μm. The surface was visually observed, and as a result, the patterns of carbon fibers were clearly observed. The thickness of the layer was measured, and as a result, the thickness was 200 μm.

Comparative Example 8

A decorative molded article was obtained by performing the operations similar to Example 6 except that the pressure during the decoration was 1.5 MPa.

The irregularity of the surface of the obtained decorative molded article satisfied Ra=6 μm. The surface was visually observed, and as a result, the patterns of carbon fibers were clearly observed. The thickness of the layer was measured, and as a result, the thickness was 200 μm.

Manufacture Example 4

Manufacturing of Flat Plate Using Mat (3)

Fibers, in which the carbon fiber "TENEX" (registered trademark) STS40-24KS (average fiber diameter 7 μm) manufactured by Toho Tenax Co. Ltd was cut to 50 mm, were opened by an opening machine. In the opened carbon fibers, many carbon fibers having the form of carbon fiber bundle were included.

Polycarbonate resin "PANLITE" (registered trademark) L-1225L (glass transition point temperature 150° C.) manufactured by Teijin Co. Ltd was melted and extruded at 290° C., and thus, polycarbonate fibers which was cut to 51 mm and had diameters of 30 μm were obtained.

After 40 parts by weight of the carbon fibers and 60 parts by weight of the polycarbonate fibers opened by the opening machine were mixed in the opening machine, nonwoven fabrics having fiber areal weight of 200 g/m² were prepared by a carding machine, the fabrics passed through a carding step. In addition, the obtained 14 nonwoven fabrics were layered, and thus, fiber layered bodies of 2800 g/m² were obtained. A mat was obtained by driving the layered bodies at a needle depth of 30 mm and the density of 500/cm² by a needle punching machine. The mat was placed in the mold having a concave portion on the upper portion. Next, the mat was pressurized for 5 minutes at the pressure of 2.0 MPa using a press device heated to 260° C., and the molded plate (III) having the thickness of 2.2 mm was obtained. Moreover, the molded plate (III) obtained in this way corresponds to the precursor of the fiber-reinforced resin shaped product according to the present invention.

With respect to the obtained molded plate (III), the analysis of the carbon fibers included in the molded plate was performed, and as a result, the ratio of the carbon fibers being contained in the form of fiber bundle was 90% (weight ratio) with respect to the total amount of the carbon fibers. The critical number of single fibers defined by the Expression (a) was 86, and the average single fiber number (N) in the carbon fiber bundles (A) constituted by fibers of the critical number of single fiber or more was 120. The ratio of the carbon fiber bundle (A) constituted by fibers of the critical number of single fiber or more was 25 Vol % of the total amount of the carbon fibers. In addition, the volume content of the carbon fibers was 28% (the content 36% of the carbon fibers based on the weight). In addition, the average thickness of the carbon fiber bundles was 50 μm, and the weight-average fiber width was 0.3 mm.

Example 11

The molded plate (III) obtained in Manufacture Example 4 was cut to 195 mm×245 mm and dried for 4 hours at 120° C. by a hot-air dryer, and thereafter, the molded plate was heated to 300° C. by an infrared heater. Separately, a mold for a flat plate (fixed mold (first moveable mold)) of 200 mm×250 mm was set to 120° C. Two heated molded plates (III) were layered and introduced into the mold, and were pressurized for 1 minute by a press pressure of 8 MPa. The shaped product obtained by the operation corresponds to the fiber-reinforced resin shaped product according to the present invention.

The mold was opened, the fixed mold slid to move to the second movable mold. Thereafter, 5 mL of the decorative material prepared in Manufacture Example 2 dropped on the center of one surface of the obtained molded plate by using a cylinder. After the dropping, the second movable mold was closed and pressurized for 3 minutes at 140° C. and 8 MPa, and the thermoplastic resin was hardened. In 3 minutes, cooling water was introduced into the mold in the state where the pressure of 8 MPa was maintained and cooled the mold to 45° C. for 5 minutes, and thus, a decorative molded article in which the layer was formed on one surface was obtained. The thickness except for the layer of the decorative molded article was 2.0 mm.

The irregularity of the surface (layer foiling surface) of the obtained decorative molded article satisfied Ra=3 μm. When the surface was visually observed, if the surface was shaded from light, the patterns of the carbon fibers were dimly viewed, and conspicuous patterns were not observed. Minute wrinkles and the roughness of the surface were not also observed. The thickness of the layer was measured, and as a result, the thickness was 200 μm. In addition, peeling test was performed based on JIS K5600 on a portion in which the patterns of the fiber bundles were dimly viewed, and as a result, the layer was not peeled, and excellent durability was achieved.

Example 12

The molded plate (III) obtained in Manufacture Example 4 was cut to 195 mm×245 mm and dried for 4 hours at 120° C. by a hot-air dryer, and thereafter, the molded plate was heated to 300° C. by an infrared heater. Separately, the mold for a flat plate (fixed mold (first movable mold)) having the size of 200 mm×250 mm was set to 120° C. Two heated molded plates (III) were layered and placed in the mold. Next, the molded plates were heated for 1 minute at the press pressure of 10 MPa, and the fiber-reinforced resin shaped product according to the present invention was manufactured.

The mold was opened, the fixed mold slid to move to the second movable mold. As the thermoplastic polyamide resin, a polyamide based hot-melt agent (MICROMELT (registered trademark) 6202 of Henkel Japan Co. Ltd) was heated to 160° C. by a heat gun to be heat-molten state, and thus, dropped on the center of the one surface of the obtained fiber-reinforced resin shaped product. After the dropping, the polyamide based hot-melt agent was pressurized for 1 minute at 160° C. and 10 MPa, and thus was spread on the surface of the fiber-reinforced resin shape product. Thereafter, in the state where the pressure was constantly maintained, in 1 minute, cooling water was introduced into the mold and cooled the mold to 45° C. for 5 minutes, and thus, a decorative molded article was obtained. Meanwhile, a heat and cool system which uses the heated pressurized water was adopted when reheating the mold after the cooling.

Minute wrinkles were not viewed on the obtained decorative molded article, and the decorative molded article was very flat (the irregularity satisfied Ra=3 μm). When the one surface was visually observed, if the surface was shaded from light, the patterns of the carbon fibers were dimly viewed, and conspicuous patterns were not observed. The thickness of the layer was measured, and as a result, the thickness was 200 μm. In addition, peeling test was performed based on JIS K5600 on a portion in which the patterns of the fiber bundles were dimly viewed, and as a result, the layer was not peeled, and excellent durability was achieved.

INDUSTRIAL APPLICABILITY

A decorative molded article including carbon fibers and a thermoplastic resin (P1) and being obtained by the manufacturing method of the present invention has excellent surface properties. The patterns of the carbon fibers are difficult to appear on the surface, occurrence of the patterns of the carbon fibers decreases, and thus, the appearance is excellent and the surface appearance also is excellent. In addition, the surface is extremely flat, and the smoothness also is excellent. Further, a layer covering the surface of the decorative molded article strongly comes into close contact with a carbon fiber resin shaped product, and durability is excellent.

The decorative molded article obtained by the present invention contains carbon fibers as the reinforcing fibers, and thus, excellent lightness and mechanical strength are achieved. Also, since thermoplastic resin is used, it is possible to reuse the thermoplastic resin. In addition, excellent surface properties are achieved. Accordingly, for example, in addition to structure members of a vehicle such as an automobile, particularly, the present invention can be used for exterior components, interior components, and ornaments.

The invention claimed is:

1. A manufacturing method of a decorative molded article having a layer which includes a thermoplastic resin (P2) on a surface of a fiber-reinforced resin shaped product including carbon fibers and a thermoplastic resin (P1), wherein the thermoplastic resin (P1) is the same kind as the thermoplastic resin (P2), the method comprising:
   (i) using a shaped product in which at least some carbon fibers are contained in a form of fiber bundle as the fiber-reinforced resin shaped product, a ratio of the carbon fibers being contained in the form of fiber bundle is 20% to 99% by volume with respect to a total amount of the carbon fibers, and placing the fiber-reinforced resin shaped product containing the fiber bundle in a mold heated;
   (ii) introducing the thermoplastic resin (P2) into the mold;
   (iii) molding the thermoplastic resin (P2) in the mold by pressurization; and
   (iv) cooling an inside of the mold, while maintaining the inside of the mold to a pressure within a range from 2 MPa to 50 MPa:
      to a temperature range from 10° C. to a glass transition point when the thermoplastic resin (P1) is an amorphous resin and the glass transition point is 10° C. or more;
      to a temperature range from 10° C. to a crystallization temperature when the thermoplastic resin (P1) is a crystalline resin and the crystallization temperature is 10° C. or more; or
      to a temperature range from 10° C. to 80° C. when the thermoplastic resin (P1) is an amorphous resin and the glass transition point is less than 10° C. or the thermoplastic resin (P1) is an crystalline resin and the crystallization temperature is less than 10° C.,
   wherein a thickness of the layer including the thermoplastic resin (P2) is within a range from 30 μm to 500 μm.

2. The manufacturing method of a decorative molded article according to claim 1, further comprising, before the step (i), (i') placing a precursor of the fiber-reinforced resin shaped product, containing at least some carbon fibers are contained in a form of fiber bundle in a heated mold and molding the precursor by heating and pressurization to manufacture the fiber-reinforced resin shaped product.

3. The manufacturing method of a decorative molded article according to claim 1,
   wherein the inside of the mold is maintained to a constant pressure within a range from 2 MPa to 50 MPa in the step (iv).

4. The manufacturing method of a decorative molded article according to claim 1,
   wherein the pressurization is performed within a range from 2 MPa to 50 MPa in the step (iii).

5. The manufacturing method of a decorative molded article according to claim 1,
   wherein the carbon fibers are discontinuous.

6. The manufacturing method of a decorative molded article according to claim 1,
   wherein an average thickness of the fiber bundle is within a range from 10 μm to 300 μm.

7. The manufacturing method of a decorative molded article according to claim 1,
   wherein a weight-average fiber width of the fiber bundle is within a range from 0.03 mm to 4 mm.

8. The manufacturing method of a decorative molded article according to claim 1,
wherein the thermoplastic resin (P1) is a crystalline resin.

9. A decorative molded article obtained by using the manufacturing method of a decorative molded article according to claim 1.

10. A decorative molded article comprising a layer which includes a thermoplastic resin (P2) on a surface of a fiber-reinforced resin shaped product including carbon fibers and a thermoplastic resin (P1),
- wherein at least some carbon fibers are contained in a form of fiber bundle in the fiber-reinforced resin shaped product, and
- a ratio of the carbon fibers being contained in the form of fiber bundle is 20% to 99% by volume with respect to a total amount of the carbon fibers,
- wherein the thermoplastic resin (P1) is the same kind as the thermoplastic resin (P2), and
- wherein a thickness of the layer including the thermoplastic resin (P2) is within a range from 30 µm to 500 µm.

11. The decorative molded article according to claim 10, wherein the carbon fibers are discontinuous.

12. The decorative molded article according to claim 10,
- wherein an average thickness of the fiber bundle is within a range from 10 µm to 300 µm, and
- a weight-average fiber width of the fiber bundle is within a range from 0.03 mm to 4 mm.

13. The decorative molded article according to claim 10,
- wherein irregularity on a surface of the layer is generally within a range from 1 µm to 5 µm by Ra.

* * * * *